H. L. WADSWORTH.
SAND CUTTING MACHINE.
APPLICATION FILED FEB. 11, 1920.

1,432,812.

Patented Oct. 24, 1922.
2 SHEETS—SHEET 1.

INVENTOR
Howard L. Wadsworth
BY
Day, Oberlin & Day
ATTORNEYS

H. L. WADSWORTH.
SAND CUTTING MACHINE.
APPLICATION FILED FEB. 11, 1920.

1,432,812.

Patented Oct. 24, 1922.
2 SHEETS—SHEET 2.

INVENTOR
Howard L. Wadsworth
BY
Day, Oberlin & Day
ATTORNEYS

Patented Oct. 24, 1922.

1,432,812

UNITED STATES PATENT OFFICE.

HOWARD L. WADSWORTH, OF CLEVELAND, OHIO.

SAND-CUTTING MACHINE.

Application filed February 11, 1920. Serial No. 357,823.

*To all whom it may concern:*

Be it known that I, HOWARD L. WADSWORTH, a citizen of the United States, and a resident of Cleveland, county of Cuyahoga, and State of Ohio, have invented a new and useful Improvement in Sand-Cutting Machines, of which the following is a specification, the principle of the invention being herein explained, and the best mode in which I have contemplated applying that principle so as to distinguish it from other inventions.

The present invention, relating, as indicated, to sand cutting machines, is particularly directed to a machine adapted to be propelled by hand and used in small foundries for the purpose of preparing the sand for use in the molds. The only machines now in use for this purpose are large cumbersome machines which are adapted to larger foundries only, and which are too large and expensive for use in the numerous smaller foundries which require some such machine for the preparation of their sand. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawings:—

Figure 1:
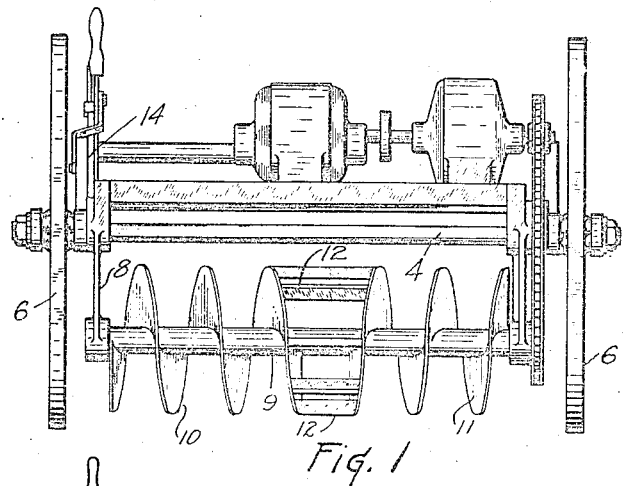
Figure 2:
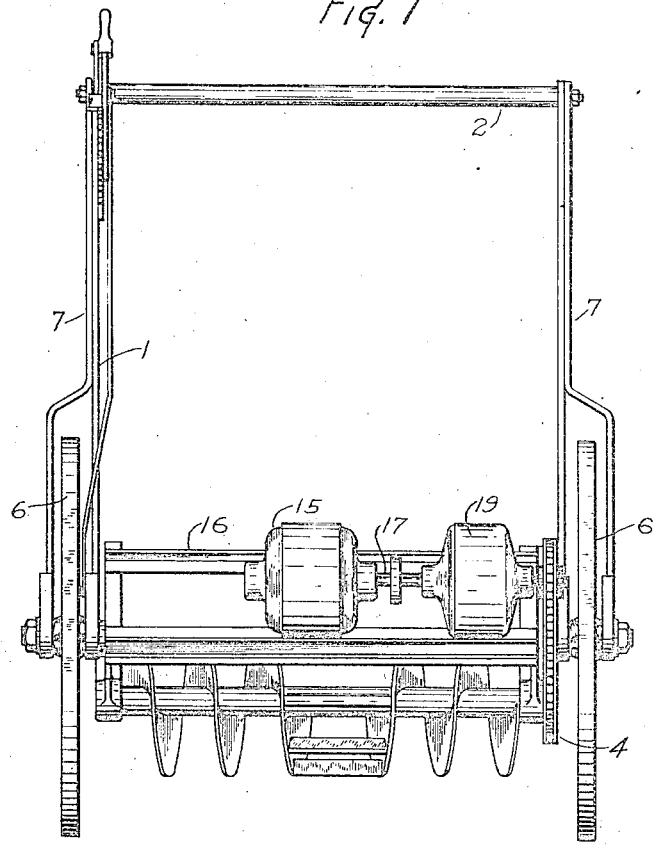
Figure 3:
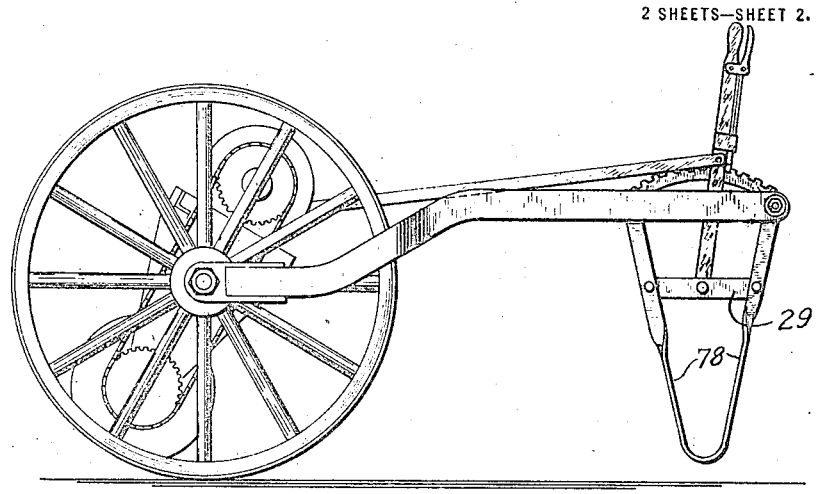
Figure 4:
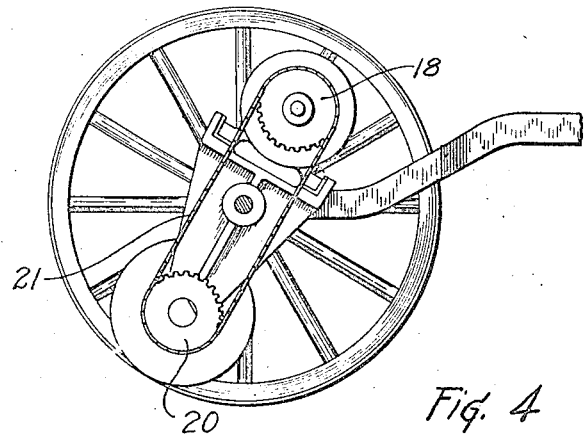
Figure 5:
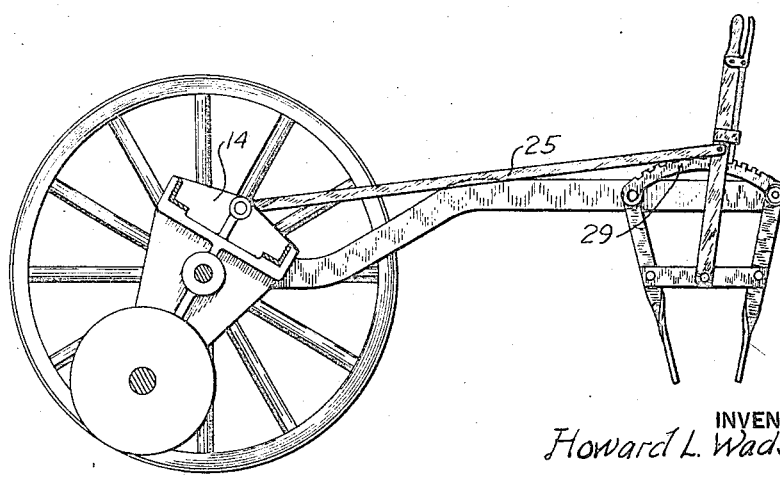

Fig. 1 is a rear elevation of my machine; Fig. 2 is a plan view of the same; Fig. 3 is a side elevation of the machine; Fig. 4 is a section on the line 4—4, Fig. 2; and Fig. 5 is a section on the line 5—5, Fig. 2.

The machine consists of a framework made up of parallel members 1 connected together at one end by means of a transversely extending bar or handle 2, and connected at their other end by means of a shaft 4, which also extends through these members 1 and spindles for the supporting wheels 6. Other members 7 are mounted against the members 1 for a portion of their length, and are then spread and attached to the outer ends of the wheel spindles to stiffen the frame for receiving the wheels 6.

It is intended that this machine be pulled over the ground and over a pile or windrow of sand which is to be cut and prepared for use, by one, or probably two, men. The machine is constructed to span the usual windrow so that the wheels 6 of the machine will be on the ground at either side of the windrow, and the men may walk along the windrow holding the handle 2, which for convenience is extended beyond the frame members.

Pivotally mounted on the axle shaft 4 is a secondary framework having arms 8 extending on either side of this axis. In these arms on one side of the axis is rotatably mounted a sand cutting element consisting of a shaft or tube 9, provided with two oppositely acting spiral plates 10 and 11 designed to convey sand from either end of the machine toward the center when the sand cutting element or cylinder is rotated in a clockwise direction, as looked at the right of Fig. 1. Mounted centrally of this element, and between the inner ends of the two spiral plates 10 and 11, are a series of longitudinally extending and radially arranged plates 12. These plates are adapted to dig up the sand as it is brought to the center of the shaft 9 and throw the same rearwardly and upwardly from the machine. The action of these plates is to cut off successive slices of sand from the pile which is being formed by the action of the spiral plates 10 and 11, and throw this sand a considerable distance through the air, which disintegrates the lumps, and to some extent removes the iron and aerates the sand.

Mounted on the other side of the axis of the secondary framework, and between the arms 14 thereof, is a motor 15. This motor is supported upon transversely extending plates 16 fixed to the arms 14, and the shaft 17 operates a gear 18 through a speed-reducing transmission mechanism 19. This transmission mechanism is not shown in detail, as any desirable speed-reducing device may be used for this purpose.

The gear 18 is vertically aligned with a second gear 20 mounted on the outer end of the shaft 9, the gear 20 being driven from the gear 18 through an endless chain 21.

The motor 15 and transmission mechanism 19 are so mounted with respect to the sand cutting cylinder that the secondary framework and the parts mounted thereon are practically balanced about the axis 4 so that no appreciable power is required to swing the secondary framework about its axis for the purpose of raising or lowering the cutting cylinder with respect to the surface being passed over. The cutting cylinder is constructed to extend to the same horizontal plane as the bottom of the wheels 6 when the cutting cylinder is in its lowest position, which prevents this cylinder from ever digging into the ground or floor. By simply tilting the secondary framework about its axis any desired elevation can be given to the sand cutting cylinder, and means for conveniently performing this operation are provided in the form of a rod 25 pivotally connected to the upper portion of one of the arms 14, and extending to a lever 26 mounted at the forward end of the machine. This lever 26 is provided with a pawl operated by a rod 27 and handle 28, the pawl being engaged in a notched segment 29 mounted on the forward end of the machine adjacent to the machine of one of the operators, and by manipulation of the lever 26 the cutting cylinder may be lifted or lowered into any desired position.

At the forward end of the machine I provide a support in the form of a V-shaped depending rod 28, which is provided with a transverse brace 29, on which is pivoted the lower end of the lever 26.

The present construction affords a machine which may be readily operated by one or at the most, two men, who can pull the machine over the pile of sand to be cut while the heavier work of transporting and throwing the sand through the air to disintegrate it is performed by power means in the form of the electric motor. At the same time the sand cutting cylinder can be set at any desired elevation, depending upon the action which is desired on the windrow of sand, or when the machine is desired to pile the sand against a wall or into a heap.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A sand cutting machine, comprising a frame and supporting wheels therefor, sand engaging means mounted on said frame, said means including conveying mechanism adapted to collect and transport sand to a given point, and high speed cutting means adapted to cut and throw such collected sand.

2. In a machine of the character described, the combination of a frame and supporting wheels therefor, sand conveying means mounted on said frame, said means including a transversely extending shaft carrying two opposed spiral plates adapted to convey sand to the center of said shaft, and high speed cutting means mounted centrally on said shaft, said means being adapted to forcibly throw such sand rearwardly from said machine.

3. In a machine of the character described, the combination of a frame and supporting wheels therefor, a member pivotally mounted about its center about a horizontal transverse axis in said frame, a sand cutting element mounted on said member on one side of its axis, and driving means connected thereto, said means being mounted on said member on the opposite side of its axis in position to counter balance said cutting element.

4. In a machine of the character described, the combination of a frame and supporting wheels therefor, a member pivotally mounted about its center about a horizontal transverse axis in said frame, a sand cutting element mounted on said member on one side of its axis, a motor mounted on said frame on the opposite side of its axis from said cutting element, and means operatively connecting said motor to said element to drive the same.

5. In a machine of the character described, the combination of a frame and supporting wheels therefor, a member pivotally mounted about its center about a horizontal transverse axis in said frame, a sand cutting element mounted on said member on one side of its axis, a motor mounted on said frame on the opposite side of its axis from said cutting element, means operatively connecting said motor to said element to drive the same, and means adapted to swing said member about its axis and maintain the same in any desired position.

6. In a machine of the character described, the combination of a frame and supporting wheels therefor, a member pivotally mounted about its center about a horizontal transverse axis in said frame, a sand cutting element mounted on said member on one side of its axis, a motor mounted on said frame on the opposite side of its axis from said cutting element, means operatively connecting said motor to said element to drive the same, and manually operable means adapted to swing said member about its axis and maintain the same in any desired position.

7. In a machine of the character described, the combination of a frame and supporting wheels therefor, a member pivotally mounted about its center about a horizontal transverse axis, a sand cutting cylinder mounted in said member on one side of the axis thereof, said cylinder being mounted to extend into the same plane as the bottom of said supporting wheels in one position of said member.

8. In a machine of the character described, the combination of a frame and supporting wheels therefor, a member pivotally mounted about its center about a horizontal transverse axis, a sand cutting cylinder mounted in said member on one side of the axis thereof, said cylinder being mounted to extend into the same horizontal plane as the bottom of said supporting wheels when in its lowermost position.

9. In a machine of the character described, the combination of a frame and a single pair of aligned supporting wheels therefor, a member pivotally mounted about its center about the axis of said wheels, a sand cutting cylinder mounted in said member on one side of the axis thereof, said cylinder being mounted to extend into the same horizontal plane as the bottom of said supporting wheels when said member is in a vertical position.

Signed by me, this 29th day of January, 1920.

HOWARD L. WADSWORTH.